UNITED STATES PATENT OFFICE.

JOHN J. BATE, OF BROOKLYN, NEW YORK, AND FRANCIS S. LOW, OF JERSEY CITY, NEW JERSEY.

IMPROVEMENT IN COMPOSITIONS FOR COVERING MEATS.

Specification forming part of Letters Patent No. 18,270, dated September 29, 1857.

*To all whom it may concern:*

Be it known that we, JOHN J. BATE, of Brooklyn, in the county of Kings and State of New York, and FRANCIS S. LOW, of Jersey City, in the county of Hudson and State of New Jersey, have invented a new and useful composition of matter to be applied to coating the surface of the covering of cloth, paper, or other flexible material to be placed around meats and other articles of food to preserve the said meats and other articles of food from injury by water, dampness, or vapor and from the attacks of vermin; and we do hereby declare that the following is a full and exact description of the ingredients and materials used in the said composition and of the manner of preparing and applying the same.

Thirty pounds of the common resin of commerce and two and a half pounds of beeswax are placed in a kettle over a slow fire and melted. Two and a half quarts of shellac varnish, formed by dissolving about two pounds of gum-shellac in a gallon of alcohol without heat, is then poured into the melted mixture, and after this six pounds of pulverized soapstone is added to and thoroughly incorporated with the other ingredients by stirring them about. When thoroughly mixed as directed the composition is ready to be applied either by inserting the meat or other article previously covered with cloth, paper, or other flexible material into it and withdrawing the same with as much of the composition adhering to the covering as it will retain, or by putting it on the article with a common paint-brush, as may be desired, in view of the quantity or size of the articles to be coated.

The specific advantages gained by using shellac varnish in the manner named instead of the gum-shellac used in other preparations for coating purposes is that the shellac cannot be dissolved and thoroughly mixed and combined with the resin in its natural state by heat, while by being previously dissolved by alcohol and used in the form of varnish it is not only thoroughly dissolved and intimately mixed with the resin, but the alcohol contained in the varnish also serves to give to the composition a greater degree of fluidity than it would possess without it. The beeswax added to the composition gives to it greater tenacity, toughness, and pliability—essential requisites for a composition to cover articles that are to be handled and thrown about both in the processes of coating and of packing for shipment than is imparted by the linseed-oil combined in other compositions for the same purpose.

We do not claim broadly as our invention the covering of meats and other articles with paper, cloth, or other flexible material; nor do we claim protecting such articles after being covered by coating their covering with a composition to protect and preserve them from injury by water, dampness, or vapor; but What we do claim as our invention, and desire to secure by Letters Patent, is—

The use of shellac varnish and beeswax, in combination with the materials described, and in about the proportions named, for the purpose of forming the composition herein set forth.

JOHN J. BATE.
FRANCIS S. LOW.

Witnesses:
M. HASKELL,
SIDNEY LOW.